Figure 1:
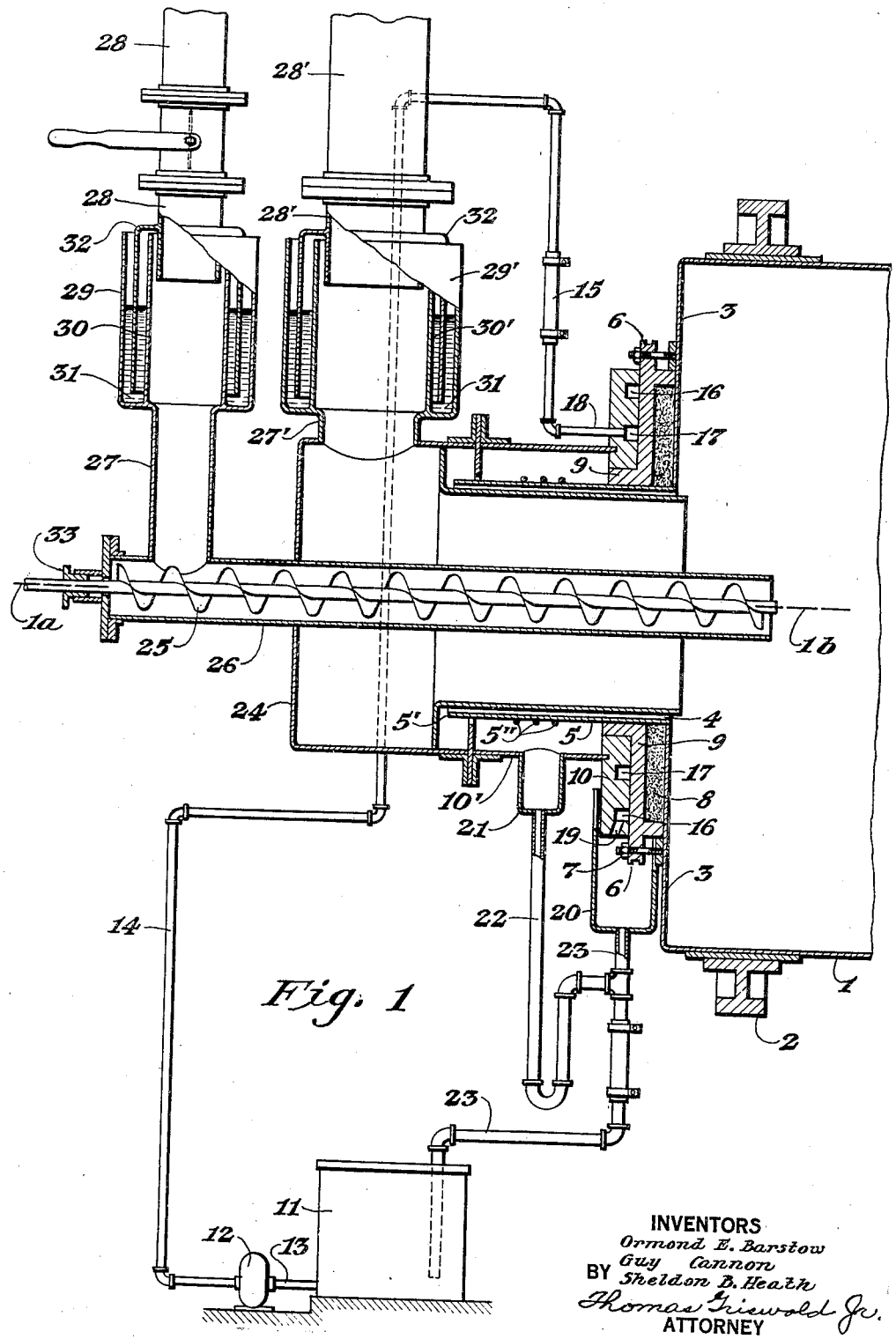

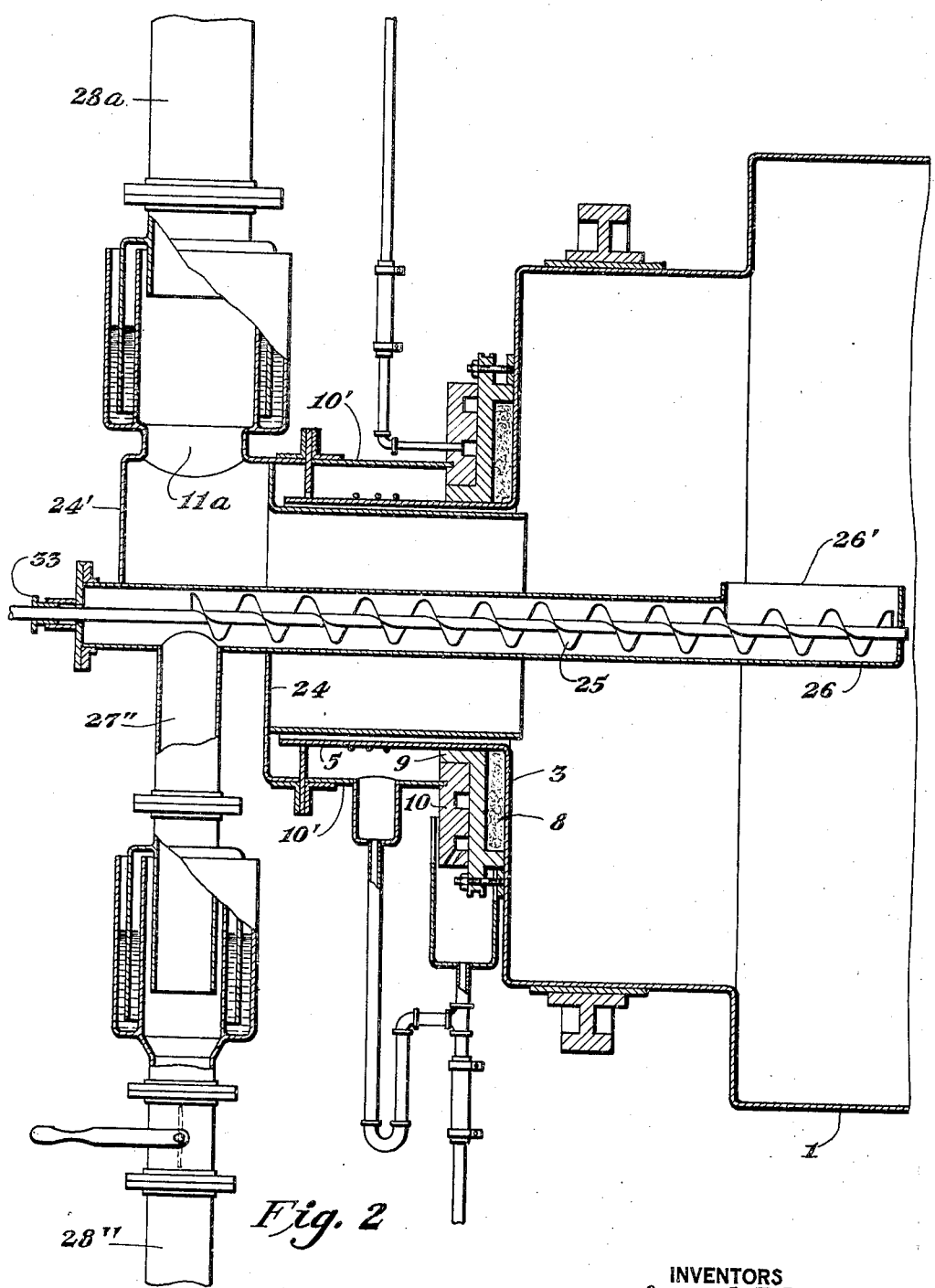

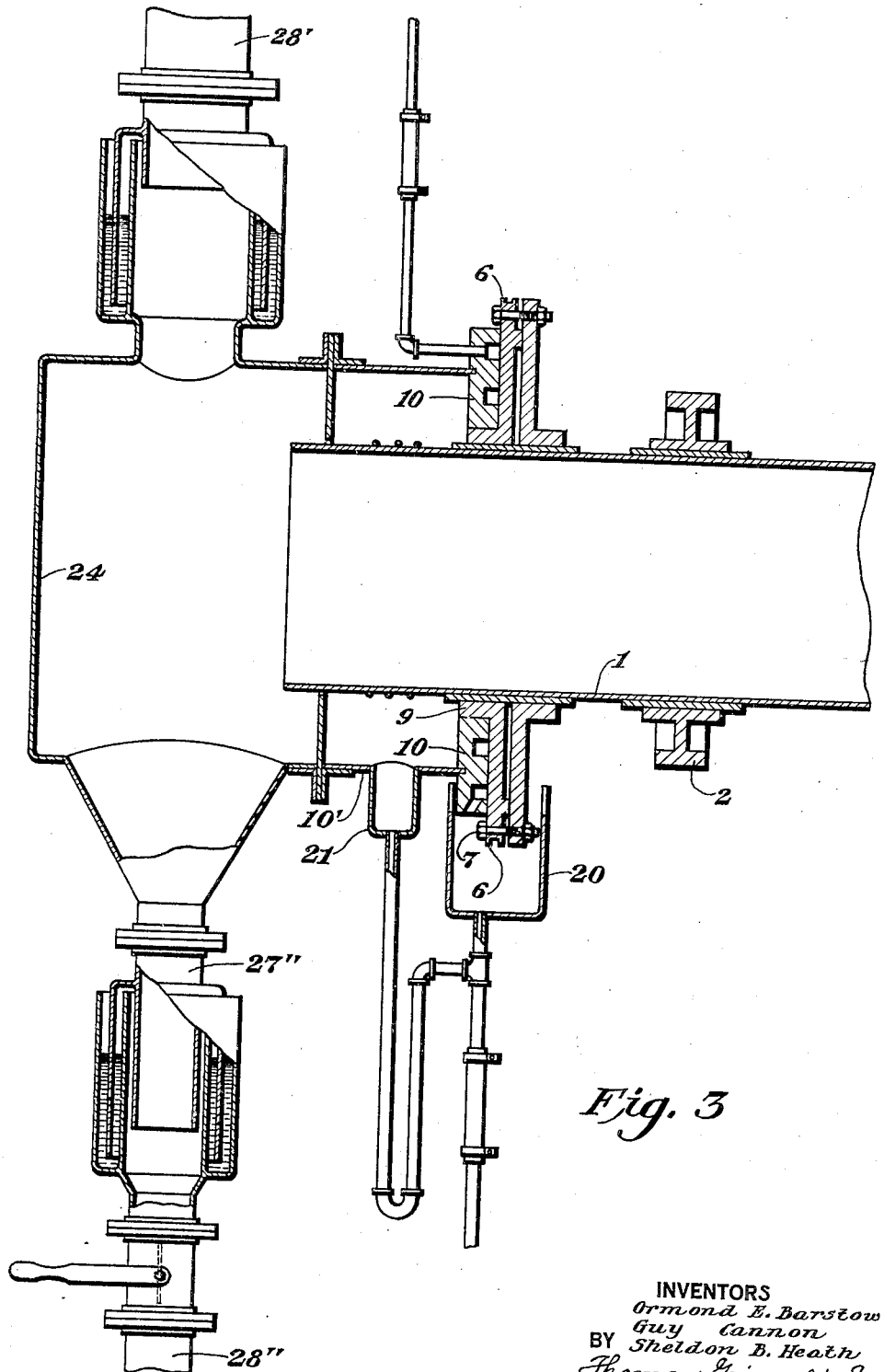

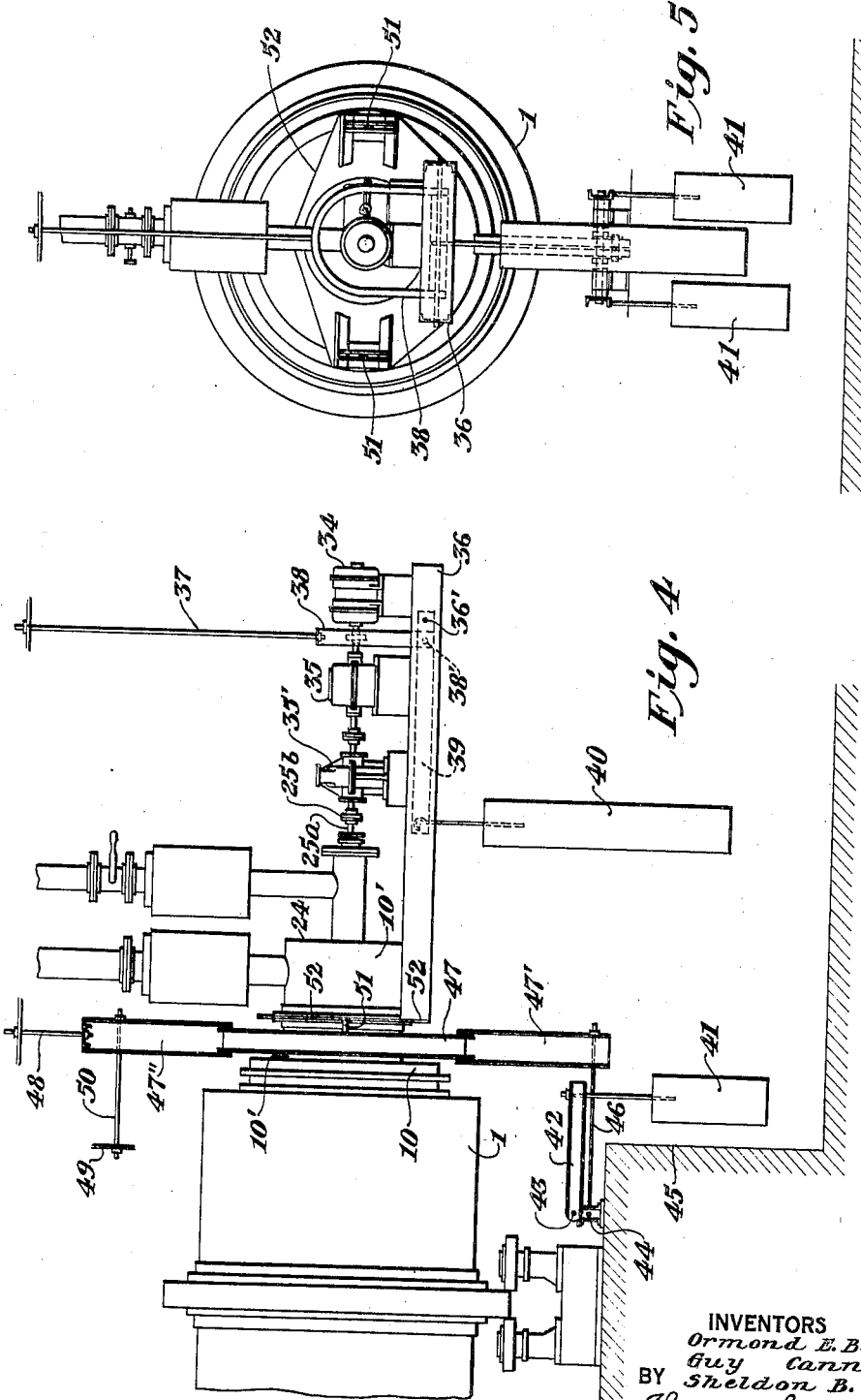

Patented Oct. 17, 1933

1,930,756

UNITED STATES PATENT OFFICE 1,930,756

ROTARY APPARATUS FOR CONTACTING GASEOUS AND NONGASEOUS MATERIALS AND GAS SEALED JOINT THEREFOR

Sheldon B. Heath, Guy Cannon, and Ormond E. Barstow, Midland, Mich., assignors to The Dow Chemical Company, Midland, Mich., a corporation of Michigan Application July 1, 1932. Serial No. 620,456

2 Claims. (Cl. 285—9)

Our invention relates, as indicated, to rotary apparatus in which gaseous and non-gaseous materials are to be contacted while access of atmosphere to the said materials or of the gaseous material to the atmosphere is prevented while so contacting, and also while introducing or withdrawing said materials.

It is frequently desired to contact a gas or a current of gas with a solid or a liquid, or a current of a solid or liquid material, under conditions in which the materials may be brought into intimate contact and the surface of the liquid or solid may be changed as by stirring to facilitate such contact. It is further frequently desired to feed the solid or liquid to an apparatus intermittently or continuously and to withdraw a part or all of same at intervals or in a continuous manner, at the same time supplying to the said apparatus the gas to be contacted therein, such supply being intermittent or continuous as required by the nature of the process being carried out. One type of apparatus adapted to such use comprises a rotating container which may be a drum, tube, mixer, or the like, into which the material may be fed, say into one end, and withdrawn from the other end thereof. In order to accomplish the contacting step and at the same time retain the gas employed separate from the atmosphere, some form of slipping, sliding or moving joint between the rotating container and the supply and discharge ducts serving it must be employed and the sliding joint therebetween should be substantially or quite gas-tight under the conditions of use. It is further desirable in many cases to provide at the same time for the supply and withdrawal intermittently or continuously of the liquid or solid to be contacted with the gas. These requirements have not been heretofore satisfactorily met and it is one of the objects of the present invention to afford the means to accomplish such ends in a practicable and effective manner. Other objects to be attained and the manner in which the problem is solved by our invention will appear as the description proceeds.

To the accomplishment of the foregoing and related ends, the invention, then, consists of the means hereinafter fully described and particularly pointed out in the claims, the annexed drawings and the following description setting forth in detail certain means for carrying out the invention, such disclosed means illustrating, however, but several of the various ways in which the principle of the invention may be used.

In said annexed drawings:—

Fig. 1 is a part vertical section of one end of a rotary dryer or mixer type of apparatus illustrating the application of our contacting apparatus, liquid sealed joint and associated features for supply and discharge of materials to be contacted. Fig. 2 is a like part vertical cross section of an end of such a rotary container having a somewhat different arrangement of parts, but further illustrating the application of our liquid sealed joint and associated features. Fig. 3 is also a part vertical cross section of an end of a rotating kiln-like apparatus further illustrating the application of our joint and associated features. Fig. 4 is a vertical elevation of one end of a rotary container apparatus in which the application of the joint and associated parts together with driving means for a feed mechanism and other features are illustrated. Fig. 5 is a vertical end view of the apparatus illustrated in Fig. 4.

We will now describe our invention as illustrated by the drawings herewith in which the reference number used is the same for like parts throughout.

Referring specifically to Fig. 1, 1 represents the shell of a rotary container such as a kiln, dryer, barrel mixer, or the like, here shown supported by the riding ring 2 concentric with the axis of rotation $1a$—$1b$ of the rotary shell 1. The end of the shell is closed by the annular plate 3, from the central aperture 4 of which a sleeve 5 projects. Upon the sleeve 5 is mounted an annular ring 6 which is secured by studs 7 to the end plate 3 of the rotary shell. The annular space 8 between the plates 6 and 3 may be filled with a heat insulating medium, if desired. Upon a hub 9 of the plate 6 is mounted an annular ring 10 which may be journaled upon said hub to face the ring 6 along a radial annular surface thereof. The opposed surfaces of the rings 6 and 10 will be preferably faced for a sliding contact. The plate 6, being secured by the studs 7 to the end plate 3 of the rotary container, will revolve with it, whereas the plate 10, being secured through a sleeve $10'$ to associated relatively fixed parts of the apparatus to be later described, is stationary. The contact surface between the rings 6 and 10 constitutes, therefore, a sliding joint between the fixed and rotating parts of the apparatus, which joint we make gas-tight under conditions of use, which may be normally atmospheric, or at lower or higher pressure relative to the atmosphere by introducing thereinto under pressure a liquid, such as an oil, non-reactive with the gas employed under the conditions of operation. 11 represents a cistern for the oil, 12 a pump connected to the cistern by pipe 13 and discharging by pipe 14 through a flexible joint 15 to groove 17 in the ring 10 through the pipe connection 18 thereto. An oil-collecting groove 16 serves to lead, normally, most of the oil flowing through the space between the rings to the vent 19. In order to collect oil emerging from the joint after use therein to seal same, a cistern-like housing 20 is provided to catch the drippage from the vent 19 and from the outer circumference of rings 10 and 6 and a second cistern 21, being a part of, or entirely gas-tight-connected to the sleeve 10', and being further connected by pipe 22 to pipe 23 draining cistern 20, drains also the cistern 21 to the supply cistern 11. Oil drip rings 5" on the rotating sleeve 5 act to cause the oil creeping along sleeve 5 to drip off into the sleeve 10' and cistern 21 rather than to proceed by such creeping to the end 5' of the sleeve 5.
Means to be hereinafter described are provided to maintain the ring 10 in suitable pressure relation with the ring 6 along its radial annular face, such ring 10 and its associated parts being suitably suspended or otherwise supported against gravity and pressed in an axial direction by suitable means hereinafter described to ensure such pressure contact. The oil will be preferably delivered under such pressure as will enable it to enter, lubricate, and seal the joint against gas passage therethrough under the conditions of pressure of ring 10 upon ring 6 and gas pressure difference, if any between the outside and inside of the joint.

The relatively stationary parts associated with and served by the joint will now be described.
The sleeve 10' is closed at its outer end by an annular plate 24, forming therewith a sort of bonnet which, aside from apertures in same, closes off the free access of the atmosphere to the interior of the rotating and fixed associated apparatus. A feed screw 25 for solid material is here shown mounted in a tube 26 passing through the plate 24 and continuing into the rotating shell 1. A feed tube 27 for solid material is connected with a supply tube 28 by a flexible fluid sealed trap-like connection, the lower portion of which has an outer shell 29 and an inner shell 30 forming an annular cistern 31 into which dips the bell 32 attached at its upper end to the supply tube 28. A sealing liquid, such as oil, unreactive with the gases contacted therewith under the conditions of use is placed in the cistern 31 to seal the flexible joint so formed. This construction forms the well-known fluid sealed flexible gas connection employed in the arts and enables solid material to be introduced to the screw via the tubes 27 and 28 out of contact with the atmosphere and sealed against entrance thereof to the apparatus or escape of gas from within. A similar connection comprised of the parts 29', 30', and 32' forms a like fluid sealed connection of the said bonnet with a gas supply or delivery duct 28' and its extension to the bonnet 27'. The constructions just described will enable solid material to be fed into the container 1 and a gas delivered to, or withdrawn therefrom, while the said container 1 is rotating, such operations being carried on out of contact with the atmosphere while the atmosphere is prevented from entrance thereinto or a gas within is prevented from escape via the sliding, moving, or flexible mechanical features necessitated by the operation in hand. The construction shown in Fig. 1, or such construction with modifications, is suited to use on the solid feed end of a rotary kiln, mixer, dryer, or other rotary apparatus to permit the introduction of solid or liquid material thereinto and the introduction or withdrawal of a gas while maintaining connections between fixed and rotating parts effectively sealed. For the introduction of liquids, the screw may be replaced by a simple tube flexibly connected to a source of supply. The type of flexible connection shown on the solid feed tube and on the gas connection represents only one of many types of flexible connections which may be used.

Fig. 2 represents one arrangement of the solid discharge end of a rotary apparatus in which the discharge screw 25 has a feed hopper 26' on the conveyor tube 26 into which suitable shovels or equivalent attached to the interior of the rotating shell 1 may deliver solid material for movement thereof by the screw to the discharge tube 27" and through a flexible connection to any point of delivery or use through the extension thereof 28". The shovels are not shown in the drawings but the employment thereof in various forms and arrangements is well understood by those versed in the art. Gas connection 28a is herein shown flexibly connected through the opening 11a into the bonnet in a manner similar to that previously described, which gas connection is adapted to serve for supply or withdrawal of gas. The connection between fixed and rotating parts of the discharge end of the apparatus here illustrated is gas sealed in the same manner as described for the supply end shown in Fig. 1, such sealing being by means of the liquid sealed ring 10. The liquid sealed flexible connections associated with ducts 27' and 28a, and the stuffing box for the conveyor stem 33 complete the sealing of this end of the apparatus.

In Fig. 3 is shown a still further arrangement for the discharge end of a rotary apparatus sealed against access to or from the atmosphere by the liquid sealed sliding joint between rings 10 and 6. Seals in discharge pipe 27" for solid and connection 28' for gas will be readily understood without further description. We will now describe and illustrate one way of maintaining suitable pressure at the sealed joint between the rings 10 and 6 of the sliding joint while also maintaining at the same time the fixed parts in cooperative adjustment to the movement of the rotary parts.

Referring to Figs. 4 and 5, which are, respectively, a side and end elevation of the solid feed end of the rotary apparatus shown in Fig. 1, a motor 34 is connected through speed reducers 35 and 35' to the stem of the conveyor screw 25a by the coupling 25b. The motor and speed reducers are mounted upon a platform 36 partly hung from above by the suspender rod 37 and yoke 38, which yoke connects with the platform 36 through a lever 39 freely pinned to the yoke 38 at 38' and to the platform 36 at 36'. From the long end of the lever is suspended a weight 40 adjusted to support the platform at the connection between the lever and the platform 36' against the force of gravity and to transmit the load through the connection 38' to the yoke 38 and suspender rod 37, whereby the platform and associated parts are suspended in equilibrium and free to move in a limited but substantial amount in any direction in response to the movements of the associated rotary parts. The left-hand end of the platform 36 is connected through plate 52 with the bonnet, which bonnet is in turn connected in manner similar to that described heretofore to the stationary ring 10. That portion of the weight of the platform and its associated parts not supported by the suspender rod 37 may be supported by a like counter-weighted suspension. In the construction herein illustrated, however, such weight is carried upon the hub 9 of ring 6 by the journal of ring 10 thereon (see Fig. 1). In order now to provide an axial thrust upon the ring 10 to maintain it in pressure contact with ring 6, a pair of counter-weights 41 acting through the levers 42 hinged at 43 upon the bracket 44 mounted upon a fixed base 45 exerts an axial pull to the left via rod 46 upon the lower extension 47' of a ring-like yoke 47 having an upward extension 47" freely suspended from above by the rod 48 and held to a fixed structure 49 by the rod 50. The rods 48 and 50 are made adjustable to permit registering the yoke with the other fixed parts of the associated apparatus. By adjusting the length of the rod 50, the counter-weight 41 can exert by means of two links 51 connecting the yoke 47 with a plate 52 on the bonnet, a pull to draw such bonnet, its attached parts, and the ring 10 to the left to bring about a pressure of ring 10 upon ring 6, which pressure may be regulated as to its application and amount by the counter-weights 41 and 40. The manner of bringing about such axial pressure as illustrated in Figs. 4 and 5 is obviously but one of many ways in which such pressure may be applied and at the same time the weight of the relatively fixed parts of the equipment may be carried to suspend same freely in space. It will be seen that the character of the suspension is such that the ring 10 and the associated parts may follow the idiosyncrasies of the rotational movement of the ring 6 consequent upon mechanical limitations of structure, maintenance of running parts, and mis-alignment due to temperature changes involved in the use of the apparatus to which the joint is applied, it being obvious that the ring 6 may not be maintained rotating in a set plane, but will wobble to a certain extent.

We have now described the apparatus illustrated in the drawings embodying our invention. We have shown and described an annular ring 6 as a part of the rotary container for the contacting ingredients and an opposed ring 10 on the relatively fixed parts constituting a closure for the container and means serving it with gaseous and/or non-gaseous materials. We have shown and described service connections, liquid sealed to the fixed parts, and capable of sufficient free relative movement to serve our purposes. We have further shown and described the suspension of the fixed parts including the screw conveyor drive in such a manner that such parts are free to move in any direction to a limited, yet substantial, degree. We have also shown and described means to apply a controlled and regulated thrust of the ring 10 upon ring 6 in an axial direction, and the supply to the rubbing contact therebetween of a lubricating gas sealing liquid.

The so disclosed features enable maintaining a gas-tight sliding joint between the rotating and fixed parts of the apparatus even if, and while, the said rotating parts rotate out of plane and/or show the substantial and to be expected eccentricities of motion common to such apparatus, and further, while maintaining gas sealed communications with the rotating container suited to serve its requirements relative to the introduction thereinto or withdrawal therefrom of gaseous and/or non-gaseous materials in intermittent or continuous manner.

It is obvious that the sealed joint herein disclosed may take various forms. The sliding contact surfaces need not necessarily be radial, although that construction is simple. They may have an annular spherical surface, or be a segment thereof, or they may be conical, or stepped, but in any event, the space between the fixed and running rings of the joint will be supplied with a liquid to seal same and the parts attached to the fixed ring will be so suspended as to permit the fixed ring member of the joint to follow any idiosyncrasies or eccentricities of the running ring to maintain a rubbing contact therebetween. It is obvious, further, that in rotary apparatus, such as kilns, mixers, dryers, and the like, through which it is desired to pass either a gas or a solid, or a liquid, such apparatus will be provided with a fluid sealed joint of the character herein described at each end thereof. If, however, the apparatus be like a bottle, open at one end only, but one such sealed joint will be required.

Our invention is adapted in general to apparatus of the character herein described, but we find it particularly suited to rotating containers through which is to be conducted, or into which is to be led, or from which is to be withdrawn, a gas to be maintained distinct and separate from the atmosphere. We regard our invention to not only include the liquid sealed joint as herein illustrated and described, but to also include in combination therewith means to enable a gas, or solid or liquid material to be introduced into, or withdrawn from, such container while maintaining the pressure contact relation between the opposed faces of such a sealed joint under conditions of operation involving a deviation thereof from a fixed plane, or location.

Other modes of applying the principle of our invention may be employed instead of the ones explained, change being made as regards the mechanism herein disclosed, provided the means stated by any of the following claims or the equivalent of such stated means be employed.

We therefore particularly point out and distinctly claim as our invention:—

1. In apparatus for contacting gaseous and non-gaseous materials, the combination of; a hollow rotatable member; a fixed end-closure member, enclosing a projecting end of said rotatable member as a sleeve in spaced relation therefrom; a sealing member comprising two annular sections having parallel sliding surfaces abutting upon each other, one such section being attached to said rotatable member, and the other section to said fixed member; pressure means to introduce a liquid between the sliding surfaces of said sealing member; and means to prevent leakage of sealing liquid to the interior of the rotatable member.

2. In apparatus for contacting gaseous and non-gaseous materials, the combination of; a substantially horizontal hollow rotatable member; a fixed end-closure member, co-axial with, and enclosing, a projecting end of said rotatable member as a sleeve in spaced relation therefrom; a sealing member comprising two annular sections having parallel sliding surfaces abutting upon each other, one such section being attached to said rotatable member, and the other section to said fixed member; pressure means to introduce a liquid between the sliding surfaces of said sealing member; and means to prevent leakage of sealing liquid to the interior of the rotatable member comprising external circumferential ridges on the projecting end of the rotatable member and an internal circumferential ridge in the sleeve portion of the fixed member.

SHELDON B. HEATH.
GUY CANNON.
ORMOND E. BARSTOW.